United States Patent [19]

Brunner et al.

[11] Patent Number: 4,942,295
[45] Date of Patent: Jul. 17, 1990

[54] APPARATUS FOR ANGLE MEASUREMENT WITH INSTALLATION MEANS

[75] Inventors: Arthur Brunner, Trostberg; Johann Mitterreiter, Tacherting, both of Fed. Rep. of Germany

[73] Assignee: Johannes Heidenhain GmbH, Traunreut, Fed. Rep. of Germany

[21] Appl. No.: 357,087

[22] Filed: May 25, 1989

[30] Foreign Application Priority Data

May 25, 1988 [DE] Fed. Rep. of Germany ....... 3817612
Mar. 18, 1989 [DE] Fed. Rep. of Germany ....... 3908932

[51] Int. Cl.$^5$ .............................................. G01D 5/34
[52] U.S. Cl. .............................................. 250/231.13
[58] Field of Search ................. 250/231 SE, 237 G; 341/13; 356/373; 33/706, 707; 324/175

[56] References Cited

U.S. PATENT DOCUMENTS

| | | | |
|---|---|---|---|
| 4,317,032 | 2/1982 | Hanus et al. | 250/239 |
| 4,342,909 | 8/1982 | Accattino | 250/231 SE |
| 4,475,034 | 10/1984 | Maddox et al. | 250/231 SE |
| 4,512,184 | 4/1985 | Ernst et al. | 250/231 SE |
| 4,556,792 | 12/1985 | Kano et al. | 250/231 SE |
| 4,639,595 | 1/1987 | Okita et al. | 250/231 SE |
| 4,727,356 | 2/1988 | Abe et al. | 250/231 SE |
| 4,751,888 | 6/1988 | Hanus | 250/231 SE |
| 4,759,218 | 7/1988 | Rodi et al. | 250/231 SE |
| 4,794,250 | 12/1988 | Togami | 250/239 |

FOREIGN PATENT DOCUMENTS

3740744 6/1988 Fed. Rep. of Germany.

Primary Examiner—David C. Nelms
Assistant Examiner—Michael Messinger
Attorney, Agent, or Firm—Toren, McGeady & Associates

[57] ABSTRACT

A disk is connected with a hub in an angle measurement apparatus and a scanning arrangement is provided for scanning a graduation on the disk, the hub is not supported in the scanning arrangement, but is connected with an externally supported drive shaft of a drive unit, the angle measurement apparatus is preassembled in such a way by the manufacturer of the measuring instrument, that the recipient can place it on the drive shaft of the drive unit and fasten it there without having to perform any adjustment. So as to preserve the axial spacing as well as the radial correlation between the scanning arrangement and the graduation predetermined by the manufacturer of the measuring instrument during the transportation process as well as during the mounting operation of the angle measurement arrangement to the drive unit, two clamping clips are inserted by way of clamping elements between the hub and the scanning arrangement, apertures in the cover and in the scanning arrangement are provided for insertion of the clamping clips and the clamping clips are slid through these apertures into grooves in the hub, the clamping clips are removed from the angle measurement apparatus after the angle measurement apparatus has been installed.

16 Claims, 8 Drawing Sheets

APPARATUS FOR ANGLE MEASUREMENT WITH INSTALLATION MEANS

BACKGROUND OF THE INVENTION

The invention is directed to an angle measurement with a graduation carrier which is connectable to a shaft by a hub, and which is scanned by a stationary scanning arrangement, installation means being provided for defining the positional correlation of the graduation carrier and scanning arrangement.

Such angle measurement apparatus are also designated as "built-in rotary encoders", which comprise no support of their own (for instance company publication of the DR. JOHANNES HEIDENHAIN GmbH, Traunreut: Rotary Encoder, issued 2/88).

A preassembled angle measurement device without its own support is known U.S. Pat. No. 4,689,595. In a preassembled state, a clamping spring causes the cohesion of the scanning arrangement with the hub to which the graduation carrier or support is fastened. A stop is provided at the hub, which contacts the scanning arrangement during the preliminary assembly and which fixes the hub in the radial and the axial direction. In this state the angle measurement apparatus is placed on the drive shaft and the scanning arrangement is fastened at the mounting surface of the drive unit. Subsequently, the clamping spring is moved out of engagement and the hub is shifted in the axial direction onto the drive shaft. This shift is required in order to cancel the contact of the stop of the hub with the scanning device and in order to assure a friction-free rotation of the hub relative to the scanning arrangement.

In this angle measurement apparatus there exists, in the preassembled state, a defined correlation between the hub and the scanning device in the radial and axial directions with respect to the hub axis, this correlation must however be removed during the installation at the drive unit. Because of the required axial displacement of the hub and of the graduation carrier relative to the scanning device, no defined correlation can be achieved without additional auxiliary means, and indeed neither in the radial nor in the axial direction. The measures disclosed in the U.S. Pat. No. 4,639,595 assure only security during transport.

Additional angle measurement devices are described in the U.S. Pat. No. 4,556,792 and German Offenlegungsschrift 37 40 744. Expensive adjustment instruments are required for the axial and radial adjustment of the hub with respect to the scanning device. The fixation of the hub with respect to the scanning device occurs by means of a plurality of elements, which must all be laboriously removed by the recipient which requires a great deal of time.

SUMMARY OF THE INVENTION

It is an object of the present invention to create an apparatus for angle measurement in which the correlation between the graduation carrier and the scanning device is already predetermined by the measuring instrument manufacturer by simple design means so that an accurate alignment of the graduation carrier relative to the scanning device is assured.

Pursuant to this object, and others which will become apparent hereafter, one aspect of the present invention resides in an angle measurement apparatus having installation means made up of at least one fastening element which is designed in the form of clamping elements embracing the hub. The clamping elements cooperate with stop faces at the hub for fixing the axial functional spacing and the radial correlation between the graduation carrier and the scanning arrangement. The clamping elements are provided in a defined position relationship at the stationary scanning arrangement.

The special advantages of the angle measurement device in the invention can be seen in that the correlation between the graduation and the scanning device in the axial and radial direction is preset by the measuring instrument manufacturer and that this correlation is maintained during delivery and installation as well as during operation, by preliminary assembly with simple means. The assembly of such an angle measuring apparatus is realizable by the recipient himself in a simple manner without expensive adjustment devices, without wasting any time for adjustment, and without specially trained personnel.

Additional features of the invention are described below in connection with the drawings.

DETAILED DESCRIPTION OF THE PREFERRED EMBODIMENTS

Figure 1:
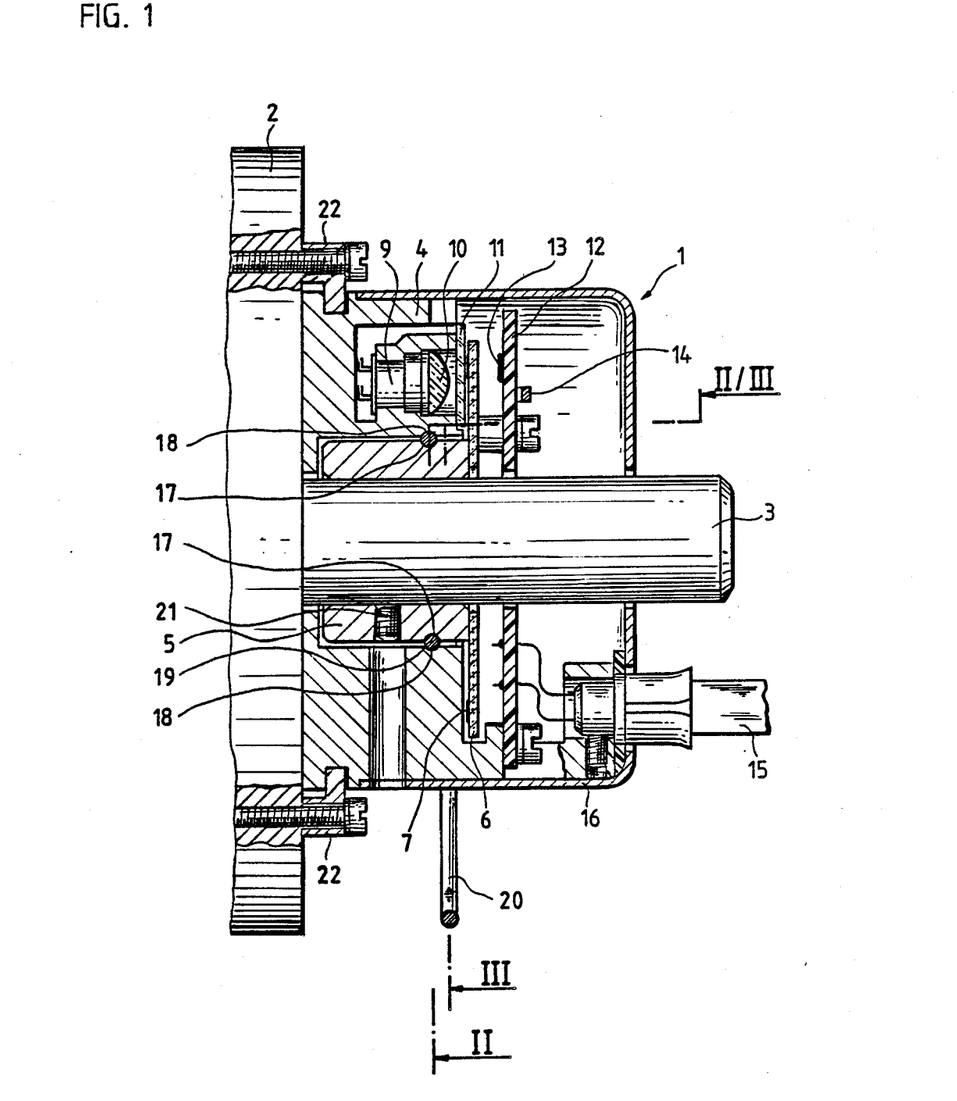
FIG. 1 is a longitudinal section through an angle measurement apparatus according to the invention.

An apparatus 1 for angle measurement is depicted in FIG. 1, and mounted on a drive unit 2, for instance a motor. The apparatus for angle measurement 1 is intended to measure the rotation of a drive shaft 3 with respect to a scanning arrangement 4. The apparatus 1 comprises a hub 5 at the center of which a disk 6 with a graduation 7 is fastened.

The scanning arrangement 4 comprises a light source 9, a condenser 10, a scanning plate 11 as well as a plate 12 with photoelectric elements 13 and additional electrical components 14. The graduation 7 is scanned in a known fashion by a transmitted light process. The scanning signals are directed through an electrical line 15 to an evaluation installation, for instance a counter or a numerical control. The electrical line 15 is conducted through a cover 16 of the apparatus for angle measurement apparatus 1.

The scanning device 4, especially the scanning plate 11, must be accurately aligned with respect to the graduation 7 in both the radial and axial directions. This correlation is predetermined by the fabrication of the hub 5 and the scanning arrangement 4. Four recesses in the form of grooves 17 angularly offset to with each other through 90°, are configured in the hub 5 at an accurately predetermined spacing from the disk 6. Four corresponding apertures 18 are provided in the scanning arrangement 4, into which two clamping clips 19, 20 are inserted. The diameter of the apertures 18 is selected so that the legs of the clamping clips 19, 20 can be inserted into the apertures 18 and the grooves 17 without having to exert much strength, and so that hold the hub 5 and the scanning arrangement 4 together in a defined manner. The axial position of the apertures 18 is also precisely preset and determines, together with the grooves 17, the spacing between the disk 6 and the scanning plate 11.

Figure 2:
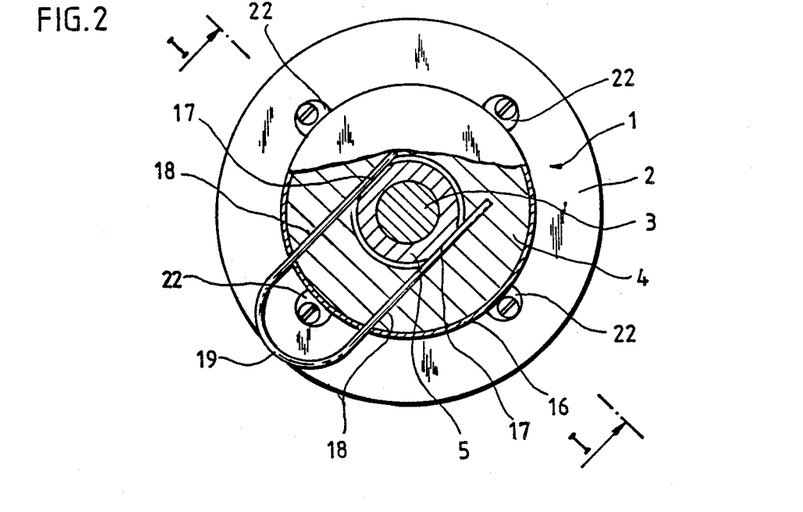
FIG. 2 shows the angle measurement apparatus in FIG. 1 along the section line II—II.
Figure 3:
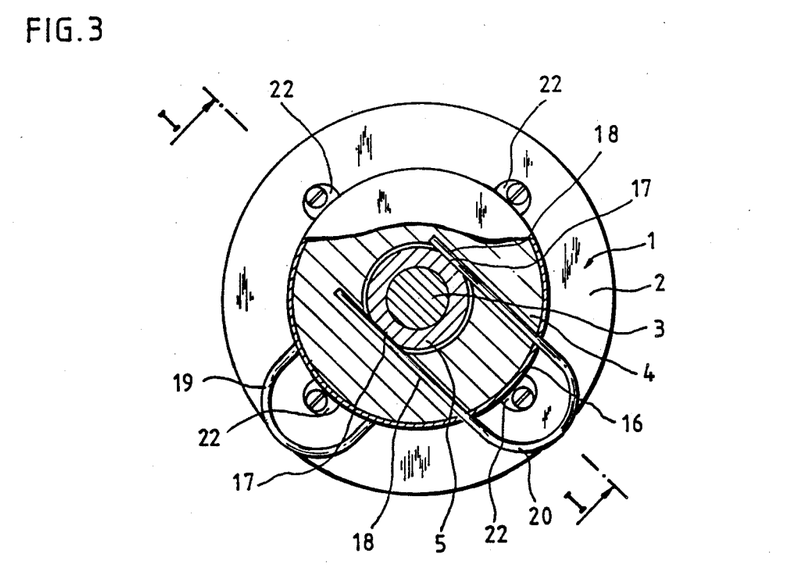
FIG. 3 shows the angle measurement apparatus in FIG. 1 along the section line III—III.

As can be discerned from FIGS. 2 and 3, the two legs, which extend parallel to each other, of each of the clamping clips 19, 20, clamp the hub 5 and the scanning arrangement 4 at two regions respectively offset to each other by 180°, wherein the two clamping clips 19, 20 are inserted perpendicularly to the hub axis and offset to each other through 180°. The exact axial fixation in two directions occurs because the legs of the clamping clips 19, 20 touch the groove 17, and the faces of the grooves 17 act as stop faces.

After the clamping clips 19, 20 have been inserted by the manufacturer, the apparatus for angle measurement 1 is delivered to the recipient. In order to install the angle measurement apparatus 1 at the drive unit 2, the preassembled angle measurement apparatus 1 is placed upon the drive shaft 3 and the hub 5 is connected with the drive shaft 3 by means of a clamping screw 21. The scanning arrangement 4 with the cover 16 is fastened at the mounting surface of the drive unit 2 by means of known clamping shoes 22. Other fastening means can be provided instead of the clamping shoes 22.

After the angular measurement apparatus 1 is tightly connected with the drive unit 2 or the drive shaft 3, the clamping clips 19, 20 are removed by pulling them out. The angular measurement apparatus 1 is ready for operation, without the recipients having to perform cumbersome adjustments. After removal of the clamping clips 19, 20 a relative rotation between the hub 5 and the scanning arrangement 4 is possible without interfering friction.

The clamping clips 19, 20 can be replaced by individual pins in a manner not shown here. Preferably three individual pins between the hubs and the scanning arrangement are provided in order to thus achieve a defined centering, which pins are inserted respectively offset to each other through 120°. If four individual pins are used the respective offset should be 90°.

With appropriate design of a clamping clip it should also suffice to use only one clamping clip. Herein it should be assured that the hub is clamped to the scanning arrangement in at least three regions angularly offset with respect to each other.

The grooves shown in the hub can also be designed as annular grooves, whereby, however, in that case the angular correlation between hub and scanning arrangement, meaning between the clamping screw and the access opening in the scanning arrangement, is no longer predetermined.

The cross-section of the clamping clips or pins can be selected as needed and the grooves in the hub and the openings in the scanning arrangement are then correspondingly shaped. Instead of a recess, a rise or several rises or elevations can be provided at the hub, which acts as stop faces for a clamping element or several clamping elements.

In the first embodiment shown in FIGS. 1 to 3, it is advantageous compared to the state of the art in that the correlation between the disk 6 and the scanning plate 11 need not be adjusted with much effort by the manufacturer and recipient, rather that it is predetermined by the manufacturing process.

Figure 4:
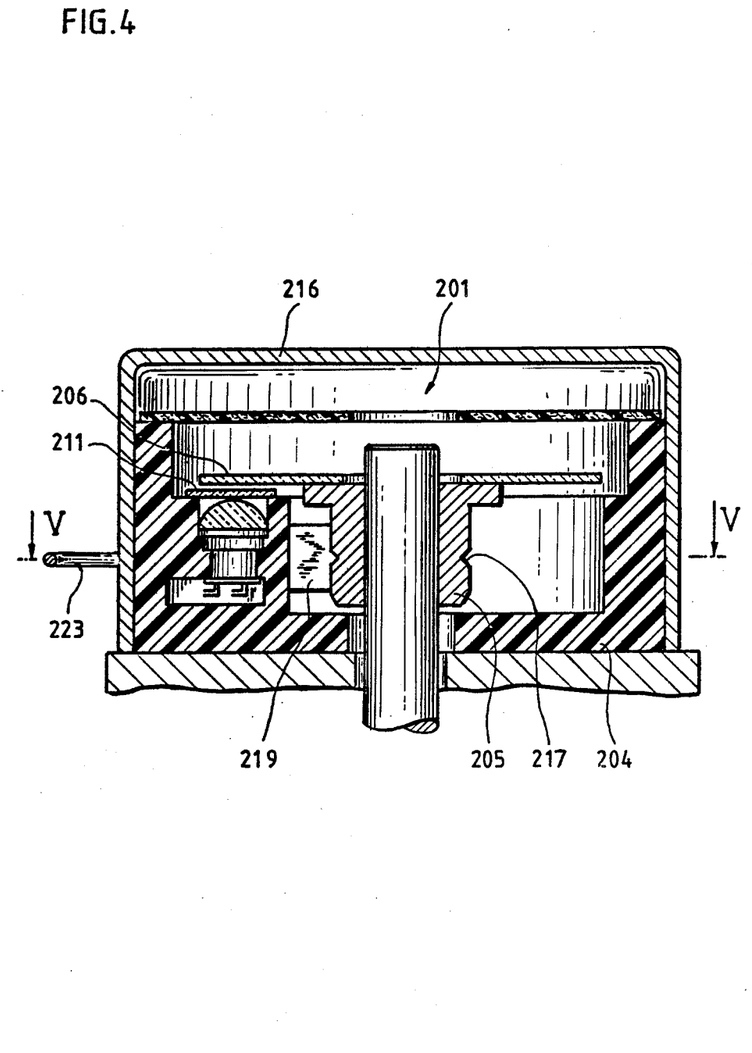
FIG. 4 is a longitudinal section through a second embodiment of an angle measurement apparatus.

A longitudinal section through a second apparatus for angle measurement 201 is shown in FIG. 4. The basic structure of the angle measurement apparatus 201 corresponds to the structure of the previously described angle measuring apparatus 1 in FIG. 1. Equivalent components are therefore not mentioned or designated. In the angle measurement apparatus 201 a fastener element in the shape of two finger-shaped projections 219, 220 serves for clamping a hub 205 to a scanning arrangement 204. The projections 219, 220 are formed at the scanning arrangement 204, wherein the scanning arrangement 204 together with the projections 219, 220 is preferably a plastics material part.

Figure 5:
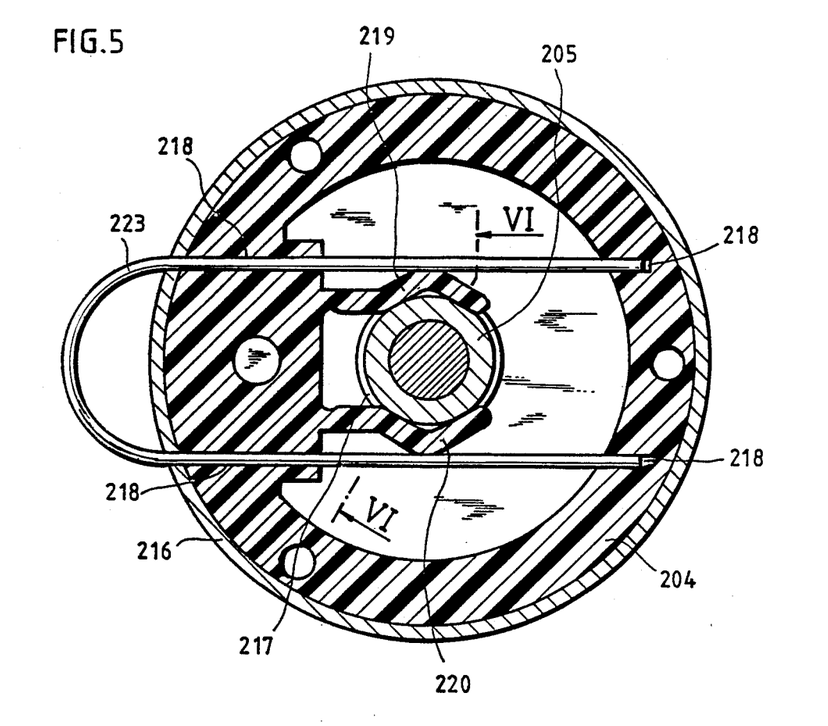
FIG. 5 shows the angle measurement apparatus in FIG. 4 along the section line V—V.

The design of the projections 219, 220 can be clearly discerned from FIG. 5. Each of the projections 219, 220 is resilient or flexible perpendicularly to the hub axis and is rigid in the direction of the hub axis. The projections 219, 220 extend perpendicularly to the axis and constitute in the rest position a space for the hub 205 having a cross-section larger than the diameter of an annular groove 217 in the hub 205. By a clamping clip 223 as a pressure element, the two projections 219, 220 are urged during the initial assembly against the surface of the hub 205 and thus also against the angular groove 217 acting as a stop face. The clamping clip 223 is inserted for this purpose into apertures 218 of the cover 216 and of the scanning arrangement 204. In order to stabilize the projections 219, 220 in the direction of the hub axis, grooves extending perpendicularly to the hub axis are provided in the projections 219, 220, which form a fit for the legs of the clamping clip 223.

Figure 6:
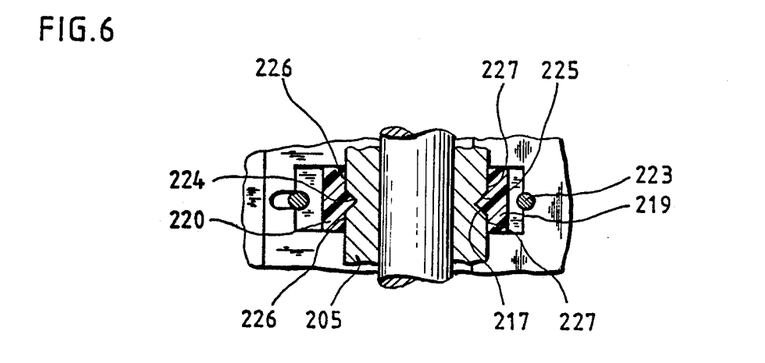
FIG. 6 is a partial section VI—VI in FIG. 5.

A particularly advantageous design of the projections 219, 220 is shown in FIG. 6. A nose 224, 225 matching the annular groove 217 and extending perpendicularly to the hub axis is provided at each of the projections 219, 220. These noses 224, 225 point in the direction of the annular groove 217 and contact the groove in the initially assembled state at four regions offset with respect to each other through 90°, respectively. The position of the noses 224, 225 in the direction of the hub axis is predetermined and defines, together with the position of the side faces of the angular groove 217, the spacing between a disk 206 and a scanning plate 211. The radial correlation of the disk 206 and the scanning plate 211 is predetermined by fabrication technology through the position of the apertures 218 as well as by the clamping of the projections 219, 220 to the hub 205 by means of the clamping clips 223.

In order that the disk 206 is aligned to be parallel to the scanning plate 211 after preliminary assembly, faces 226, 227 are provided at the projections 219, 220 on both sides of the noses 224, 225, which touch the surface of the hub 205 externally of the annular groove 217. A tilting of the hub 205 and thus a destruction of the disk 206 during transportation is thereby avoided. This design is also advantageous in the subsequently described angle measurement apparatus 301, 401, 501, 601. The recipient fastens the preassembled angle measurement apparatus 201, as has already been described in connection with FIGS. 1 to 3, and removes the clamping clip 223 from the aperture 218 of the scanning arrangement 204. The projections 219, 220 revert into their position of rest, in which they no longer contact the annular groove 217 and the hub 205.

Figure 7:
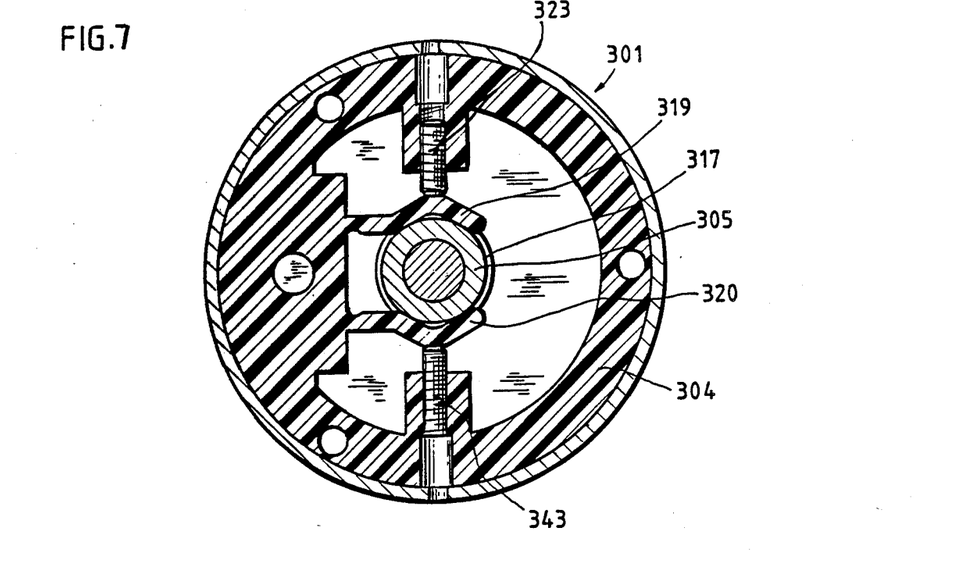
FIG. 7 is a third embodiment of an angle measuring apparatus in cross-section.

In a third embodiment of an angle measurement apparatus 301 in FIG. 7 two screws 323 and 343 instead of the clamping clips 223 are threaded into a scanning device 304 and press two projections 319, 320 into an annular groove 317 in a hub 305. The further structure of the angle measuring device 301 corresponds to the build-up of the already described angle measuring devices 1 and 201.

Figure 8:
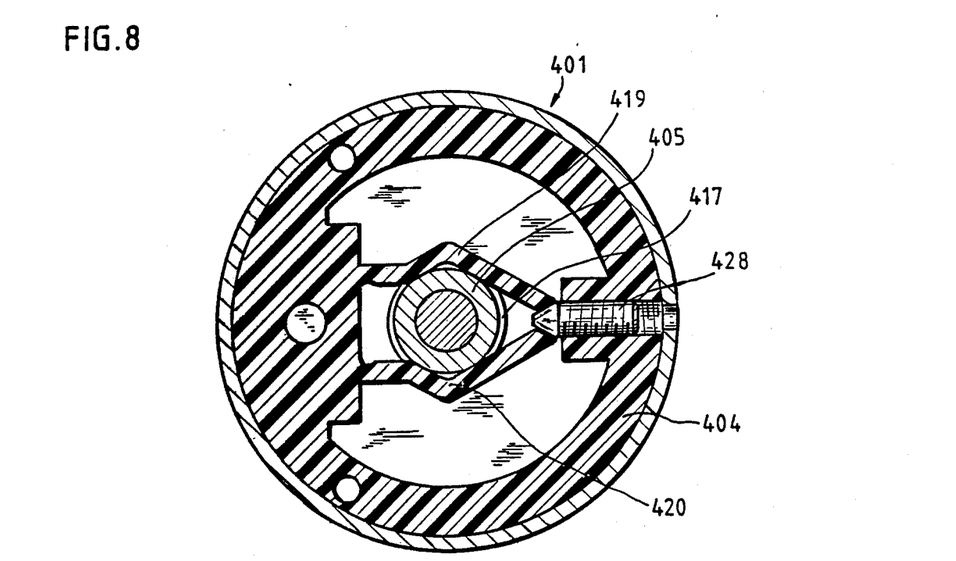
FIG. 8 is a fourth embodiment.

A fourth embodiment of an angle measurement device 401 is shown in FIG. 8. In this case two protrusions 419, 420 are already fabricated in such a way that they embrace a space in a finger-shaped manner, whose cross-section is smaller than the diameter of an annular groove 417 in a hub 405. The protrusions 419, 420 are again designed to be stiff in the direction of the hub axis and resilient perpendicularly to the hub axis. During initial assembly the hub 405 is inserted into the space embraced by the protrusions 419, 420. Herein the protrusions 419, 420 are pressed outward and snap into the annular groove 417 upon reaching it. After the initial assembly, the hub 405 is automatically held and fastened by the two protrusions 419, 420 in the axial and radial directions without additional auxiliary means. The angle measuring apparatus 401 is fastened in this state to a drive unit and the recipient spreads the two protrusions 419, 420 outward by means of a spreading member, which, for instance, is a screw 428. In the mounted state the clamping between the hub 405 and a scanning device 404 is thus cancelled and the hub 405 can freely rotate with respect to the scanning arrangement 404.

Screw 428 is threaded into the scanning arrangement 404 perpendicularly to the hub axis and comprises a cone at one end, with the help of which the two protrusions 419, 420 are urged out of the annular groove 417 when the screw 428 is threaded in. If the angle measurement apparatus 401 is to be removed from one drive unit and mounted on another drive unit, this is easily possible in this design. The screw 428 is rotated backwards so that the two protrusions 419, 420 snap again into the annular groove 417 and fasten the hub 405 in a defined manner to the scanning arrangement 404. The angle measurement apparatus 401 is removed in this state from one drive unit and placed upon the other drive unit.

Figure 9:
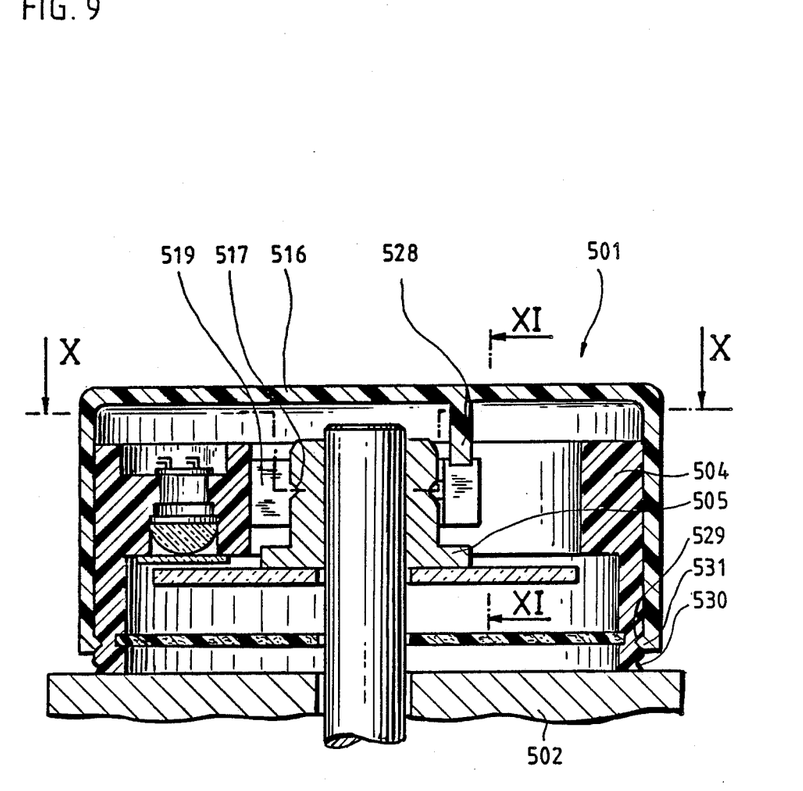
FIG. 9 is a fifth embodiment of an angle measurement apparatus with a cover in longitudinal section.
Figure 10:
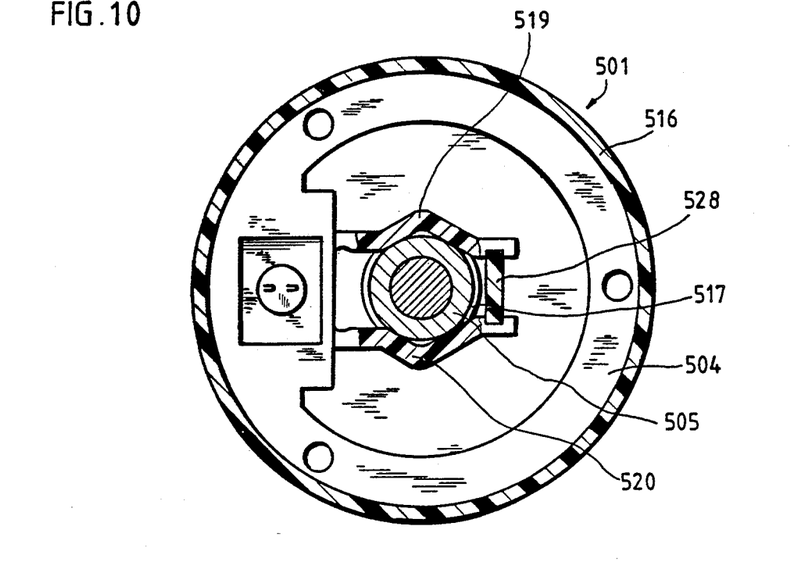
FIG. 10 is a partial section of the angle measurement apparatus in FIG. 9 along the section line X—X.
Figure 11:
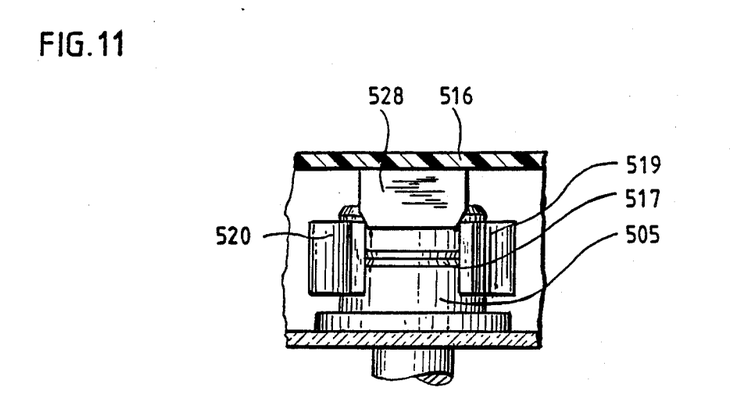
FIG. 11 is a partial section of the angle measurement apparatus in FIG. 9 along the section line XI—XI.

In FIGS. 9, 10, and 11 a sixth embodiment is shown. The spreading element is formed in this case by a wedge 528 which is fixed to a cover or is molded thereto in the example shown. This angle measurement apparatus 501 does not differ from the already described angle measurement devices 1, 201, 301, 401 as far as its basic structure is concerned. The protrusions 519, 520 are designed as described in FIG. 8.

After mounting the angle measurement apparatus 501 on a drive unit 502 the cover 516 is placed over a scanning apparatus 504 in the direction of the hub axis, herein the wedge 528 urges the two protrusions 519, 520 out of an annular groove 517 in a hub 505.

A first groove 529 is configured at the outer periphery of the scanning arrangement 504 for fixing the cover 516 during the transport of the angle measurement apparatus 501. This cover 516 comprises a nose 531 which snaps into the groove 529 when the cover 516 is put into place. In this position the wedge 528 does not yet urge the protrusions 519, 520 out of the annular groove 517. The groove 529 and the nose 531 form a security for the cover 516 during transportation. Prior to mounting the angle measurement apparatus 501 on the drive unit 502 the cover 516 is removed.

The cover 516 can be made to snap into a second position with respect to the scanning arrangement 504. For this purpose the scanning arrangement 504 comprises a second groove 530. After mounting the angle measurement arrangement 501 on a drive unit 502 the cover 516 is put in place the direction of the drive unit 502. Herein the wedge 528 urges the two protrusions 519, 520 outward away from the side faces of the annular groove 517 and the nose 521 snaps in the end position into the groove 530.

Figure 12:
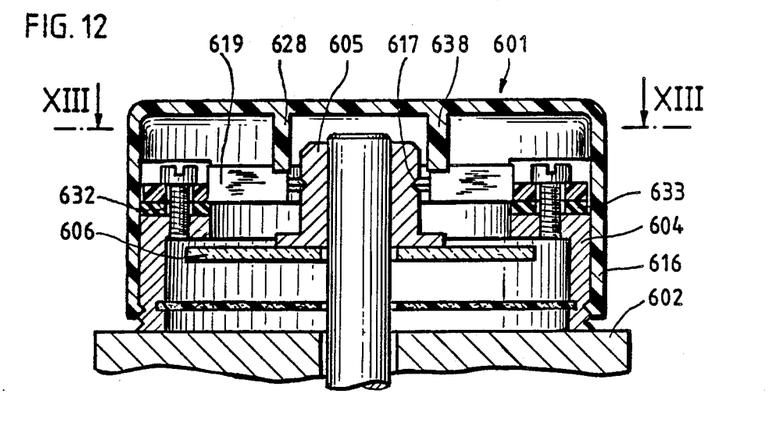
FIG. 12 is a sixth embodiment of an angle measurement apparatus with a cover in longitudinal section.
Figure 13:
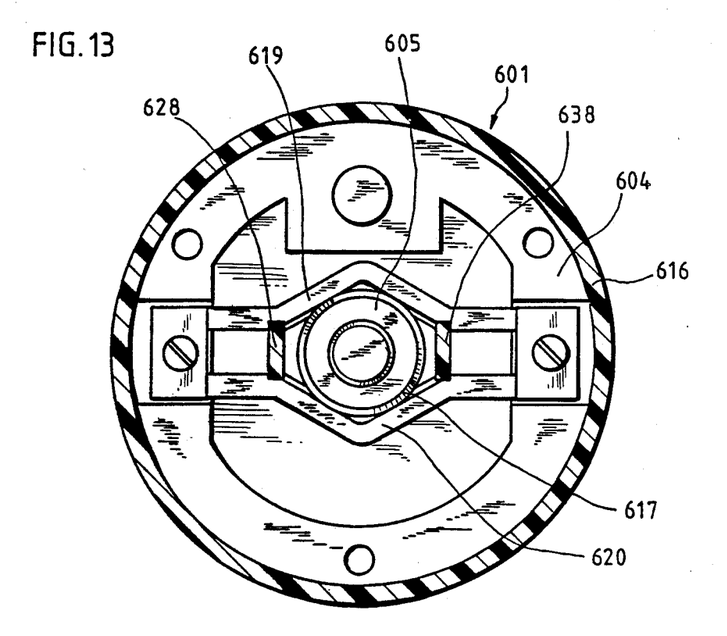
FIG. 13 is an angle measurement apparatus according to FIG. 12 along the section line XIII—XIII.

An angle measurement device 601 according to the FIGS. 12 and 13 correspond to the angle measurement device 501 described above as far as its structure is concerned. The clamping elements of a scanning arrangement 604 are designed as webs 619, 620. The ends of the two webs 619, 620 are fastened at the scanning arrangement 604. The two webs 619, 620 form a space whose cross-section is smaller than the diameter of an annular groove 617 in a hub 605. The webs 619, 620 are again rigid in the direction of the hub axis and resilient perpendicularly thereto. During initial assembly, the webs 619, 620 snap into the annular groove 617 and contact the two side faces of the angular groove 617 in such a way that the hub 605 is held in a predetermined position.

After mounting the angle measurement device 601 on a drive unit 602, the automatic clamping of the webs 619, 620 is cancelled by insertion of a spreading element. This spreading element is formed by two webs 628, 638 in this sixth embodiment. These wedges 628, 638 are again molded at a cover 616 and coact with the webs 619, 620 when the cover 616 is put into place.

Platelets 632, 633 are shown in FIG. 12 between the ends of the webs 619, 620 and the scanning arrangement 604. The thickness of these platelets 632, 633 defines the axial position of the webs 619, 620 with respect to the scanning arrangement 604. The manufacturer can obtain different spacings between a disk 606 and a scanning plate, not shown here, by selecting suitable platelets 632, 633. The platelets 632, 633 can also be designed as spring washers.

The above embodiments have the advantage that the recipient can reinstall the angle measurement apparatus 1, 201, 401, 501, 601 moved from one drive unit onto another drive unit without much effort. Herein the correlation between the hub 5, 205, 405, 505, 605 and the scanning arrangement 4, 204, 404, 504, 604 is maintained without any adjustment.

The circumstance that no element has to be removed from the angle measurement apparatus 401, 501, 601 when the angle measurement apparatus 401, 501, 601, is mounted on a drive unit 402, 502, 602, is another advantage in the embodiments according to FIGS. 8 to 13. Furthermore, these designs have the advantage that, after the scanning arrangement 404, 504, 604 has been fabricated, fine machining of the projections 419, 420, 519, 520 or of the webs 619, 620 for accurate matching to the diameter of the annular groove 417, 517, 617 can be realized with simple means. The scanning arrangement 404, 504, 604 with the projections 419, 420, 519, 520 as well as the webs 619, 620 is, for instance, a die cast or an injection molded part, in which the inner faces of the projections 419, 420 and the webs 619, 620 are already fabricated to be accurate or are subsequently machined by turning or grinding. These inner faces define, together with the faces of the annular groove 417, 517, 617, the radial and axial position of the hub 405, 505, 605 relative to the scanning arrangement 404, 504, 604.

The webs can be designed in such a way that they are pressed by means of at least one pressure element into a recess.

In the embodiments shown the angle measurement device is placed upon the drive unit in the direction of the hub axis. If the scanning arrangement has U- or V-shaped stop faces, which coact with a centering flange of the drive unit, then the angle measurement apparatus can also be advanced toward the drive unit perpendicularly to the hub axis.

The invention is not limited to the angle measurement apparatus shown, which functions with light and electricity, rather it can also be realized with inductive, magnetic or capacitive angle measurement devices. The graduation can be designed herein incrementally or absolutely, for instance as a wedge filter or a resilient strip.

In the embodiments shown the hub is designed in the form of a hollow shaft. It can however also be designed as a solid shaft, which is connected by suitable means with the drive shaft, for instance, a hollow shaft.

In all the angle measurement devices described the axial position of the hub relative to scanning arrangement is fixed by the cooperation of a recess in the hub with surface regions of fixing element such as clamping clips, pins, projections or webs. However, it is equally possible to provide at least one elevation or rise at the hub, or several angularly offset elevations, at which the fixing or fastening elements engage and fix the axial positions in the two directions.

If a cover of an angle measurement device is placed upon a scanning arrangement by rotation, thus if it is for instance threaded on, then spreading elements can be designed in such a way on the cover, that they urge the projection or the webs out of the recess or the elevation because of the threading-on rotation.

While the invention has been illustrated and described as embodied in an apparatus for angle measurement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An angle measurement apparatus, comprising:
   a graduation carrier;
   a hub provided so as to connect the apparatus to a shaft and having stop faces;
   a stationary scanning arrangement arranged so as to scan the graduation carrier; and
   installation means for defining a positional correlation of the graduation carrier and the scanning arrangement, the installation means including at least one fastening element which is designed in the form of clamping elements provided so as to embrace the hub and cooperate with the stop faces of the hub so as to fix the axial functional spacing and radial correlation between the graduation carrier and the scanning arrangement, the clamping elements being provided in a defined positional relationship at the stationary scanning arrangement.

2. An angle measurement apparatus according to claim 1, wherein the stop faces are formed at least by one of a groove-shaped recess extending concentrically to the hub axis or an annularly-shaped elevation at the hub.

3. An angle measurement apparatus according to claim 1, wherein the stop faces are formed by one of individual groove-shaped recesses or elevations in the hub angularly offset with respect to each other.

4. An angle measurement apparatus according to claim 1, wherein the clamping elements are formed by legs of at least one U-shaped clamping clip which is insertable into apertures in the scanning arrangement.

5. An angle measurement apparatus according to claim 4, wherein two U-shaped clamping clips are provided whose legs are in contact with stop faces of four groove-shaped recesses angularly offset with respect to each other.

6. An angle measurement apparatus according to claim 1, wherein the clamping elements are one of finger-shaped projections or webs of the scanning arrangement.

7. An angle measurement apparatus according to claim 6, wherein each of the finger-shaped projections or webs includes a nose provided so as to point towards, and be in contact with the stop faces of the hub.

8. An angle measurement apparatus according to claim 6, wherein the projections or the webs are resilient transversely to the hub and are stiff in the direction of the hub axis.

9. An angle measurement apparatus according to claim 8, and further comprising at least one pressure member provided so as to press the projections or the webs against the stop faces.

10. An angle measurement apparatus according to claim 8, and further comprising spring means for pressing the projections or the webs by spring force against the stop faces, and at least one spreading element provided so as to selectively cancel the spring force.

11. An angle measurement apparatus according to claim 9, and further comprising a U-shaped clamping clip provided as a pressure member which insertable into apertures of the scanning arrangement.

12. An angle measurement apparatus according to claim 9, wherein two pressure members are provided which are formed as screws and provided in the scanning arrangement.

13. An angle measurement apparatus according to claim 10, wherein two finger-shaped projections and one spreading element are provided the one spreading element being displaceable in the scanning arrangement transversely to the hub axis, and the spreading element having faces in contact with the projections.

14. An angle measurement apparatus according to claim 10, and further comprising a cover for the scanning arrangement, at least one spreading element being provided at the cover, the spreading element being provided so as to be contactable with one of the projections or webs when the cover is placed on the scanning arrangement.

15. An angle measurement apparatus according to claim 14, and further comprising snap-in elements arranged so as to connect together the cover and the scanning arrangement in a first snap-in position where one of the projections or webs are in contact with stop faces of the hub, and a second snap-in position wherein the connection between one of the projections or webs and the stop faces is releasable by the at least one spreading element.

16. An angle measurement apparatus according to claim 15, wherein the snap-in elements include two grooves in the scanning arrangement and a matching nose in the cover.

* * * * *